March 14, 1950   E. W. BOZARTH   2,500,448
SCREEN LEVELING DEVICE
Filed March 15, 1948   4 Sheets-Sheet 1
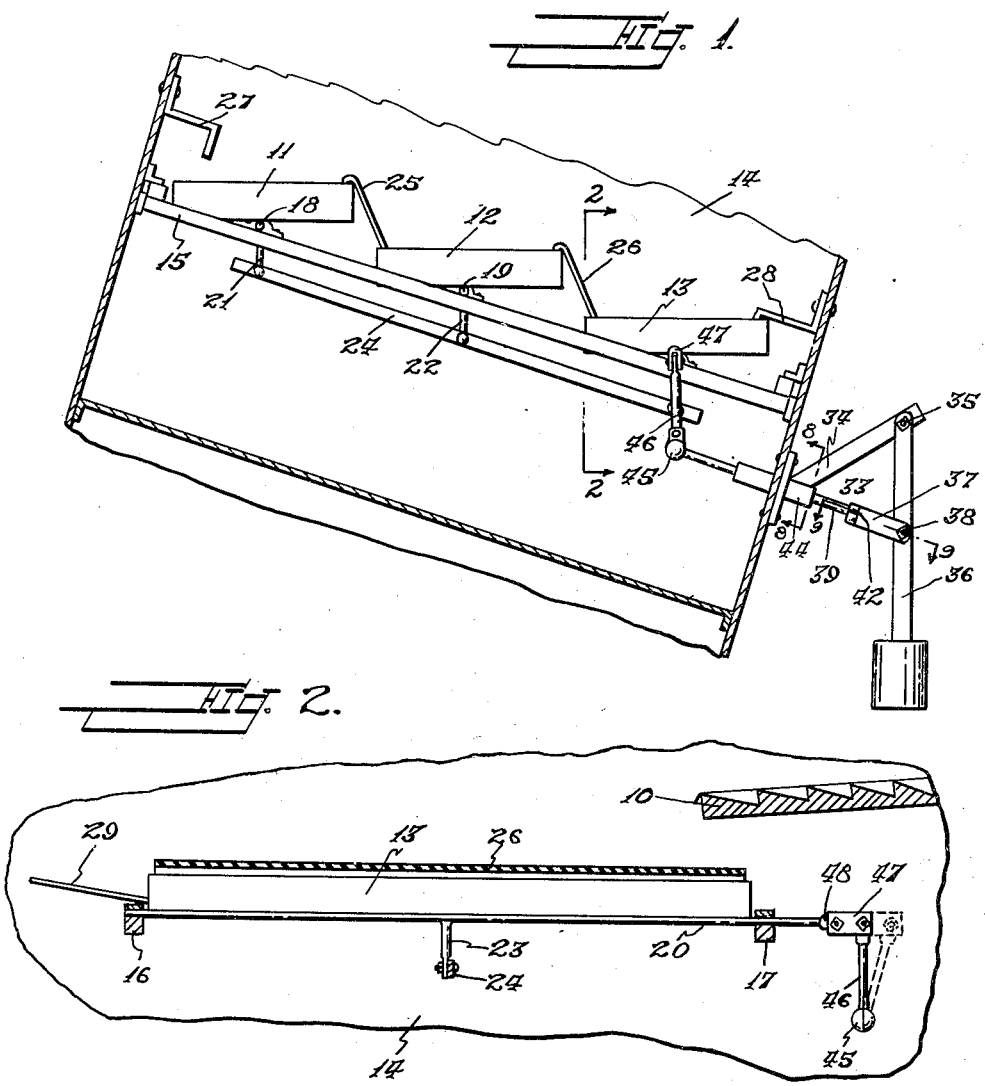
INVENTOR.
Edward W. Bozarth
BY March 14, 1950 E. W. BOZARTH 2,500,448
SCREEN LEVELING DEVICE
Filed March 15, 1948 4 Sheets-Sheet 2

INVENTOR.
Edward W. Bozarth
BY
Smith & Wells

March 14, 1950     E. W. BOZARTH     2,500,448
SCREEN LEVELING DEVICE
Filed March 15, 1948     4 Sheets-Sheet 3
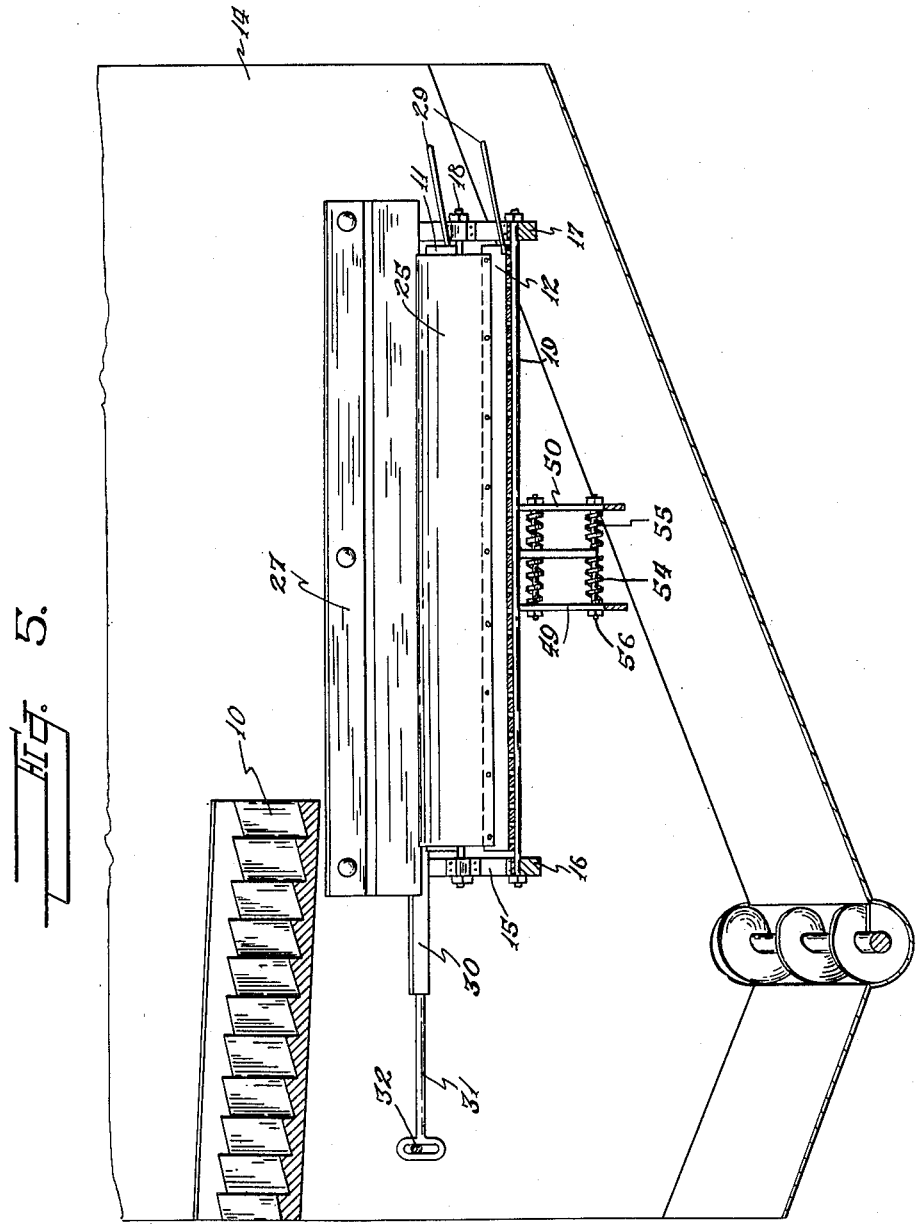
INVENTOR.
Edward W. Bozarth
BY
Smith & Wells March 14, 1950 E. W. BOZARTH 2,500,448
SCREEN LEVELING DEVICE
Filed March 15, 1948 4 Sheets-Sheet 4
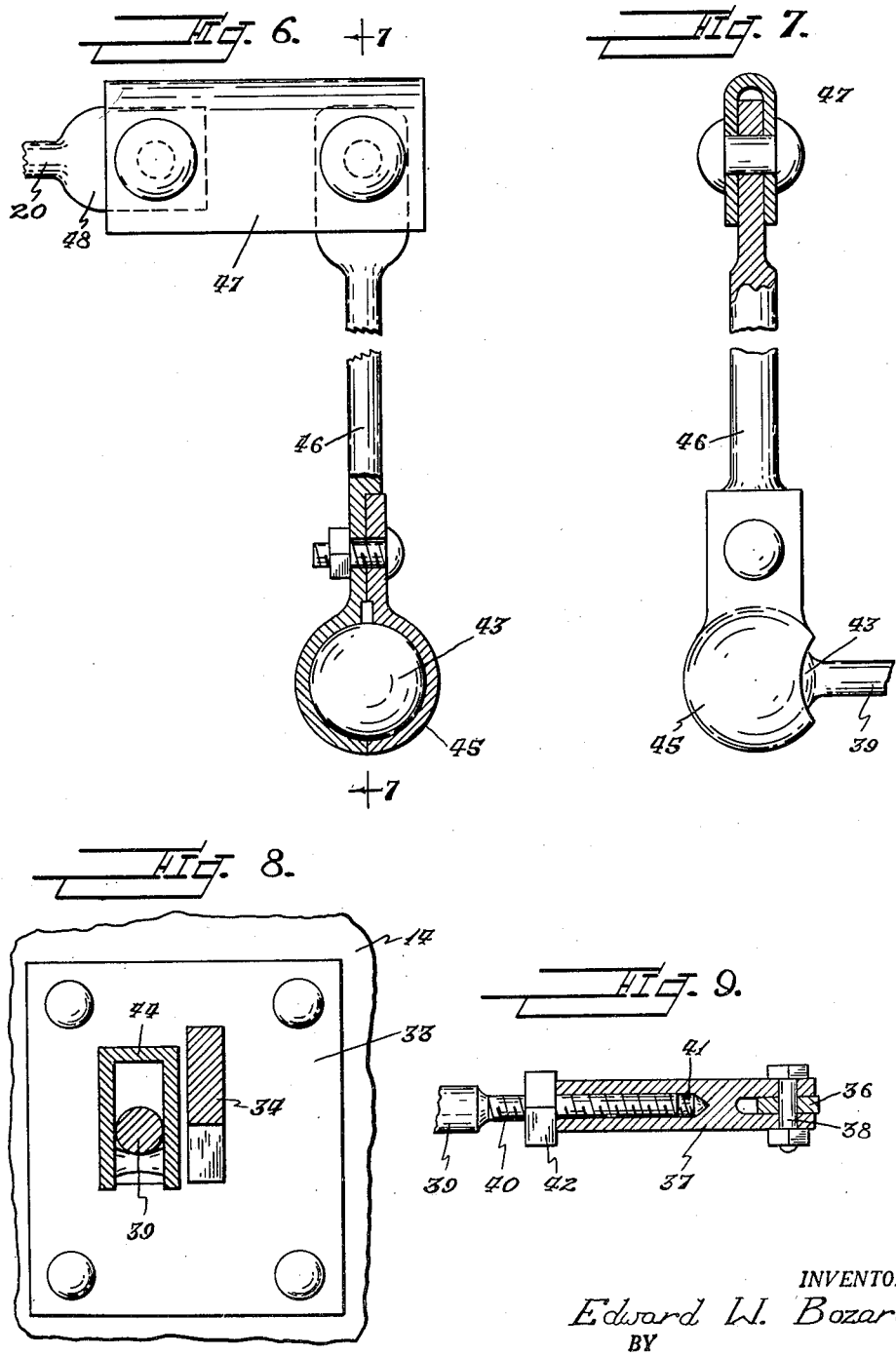
INVENTOR.
Edward W. Bozarth
BY
Smith & Wells Patented Mar. 14, 1950

2,500,448

UNITED STATES PATENT OFFICE 2,500,448

SCREEN LEVELING DEVICE

Edward W. Bozarth, Culdesac, Idaho

Application March 15, 1948, Serial No. 15,032

6 Claims. (Cl. 209—416)

My invention relates to improvement in a screen leveling device.

The present prevailing method of harvesting such crops as wheat, barley, rye, etc., is by means of a combined cutting and threshing machine, which is driven by a suitable power means. Since these combined harvesters travel over the fields, they are subject to the effects of the contour of the land. Much effort has been made to provide a means for keeping the "shoes," including the screens, where the seed is separated from the straw, chaff, etc., in a level condition. If the shoes are tilted sidewise, the seeds, etc., will move to one side of the machine, overloading that side of the machine and often causing a loss, due to faulty cleaning, and a further loss, due to seeds being carried over with the straw and chaff.

I am aware that many leveling devices have been applied to harvesters of this type. Some of them are directed to taking care of the leveling in the direction of travel of the machine. See, for example, the patent to Brown, 1,064,440; the patent to McIntyre, 1,917,536; and the patent to Martyn, 915,688. In other cases the leveling mechanisms have been directed to the problem of taking care of transverse tilting. Some examples of this type of mechanism are shown by the following patents: Laswell, No. 645,228 (this patent provides means to correct both endwise and lateral tilting), and Heald, No. 509,082. My invention is primarily directed toward taking care of the transverse or lateral tipping of the screens, although the principles thereof are not so limited.

It is the purpose of my invention to provide a novel screen and screen leveling construction for combined harvesters whereby the passage of the seeds and waste material is over a series of laterally adjacent screens which rise and fall relative to each other as the harvester changes its angle to the horizontal but which remain level from side to side.

It is a further purpose of my invention to provide in a combined harvester a novel shoe-screen construction with means whereby a plurality of screens arranged side by side may be vibrated in the usual manner, and a novel leveling device for communicating the leveling action of a pendulum to the several screens in order to maintain their level transversely of the machine, even though one screen may be substantially higher than another due to tilting of the harvester.

Other and more detailed objects and advantages of my invention will appear from the following description and the accompanying drawings, illustrating a preferred form of the invention. The drawings and description are, however, illustrative and are not intended to restrict the invention in scope beyond the limitations on the claims.

In the drawings:

Figure 1 is a somewhat diagrammatic cross sectional view through the housing of a combined harvester, showing my improved arrangement of screens and the mechanism for operating them;

Figure 2 is a sectional view taken on the line 2—2 of Figure 1;

Figure 5 is a sectional view taken on the line 5—5 of Figure 4;

Figure 6 is an enlarged fragmentary detailed view of a portion of the operating mechanism shown in Figure 1 and Figure 2;

Figure 7 is a sectional view taken on the line 7—7 of Figure 6;

Figure 8 is a fragmentary sectional view taken on the line 8—8 of Figure 1; and

Figure 9 is an enlarged fragmentary sectional view taken on the line 9—9 of Figure 1.

Figure 3:
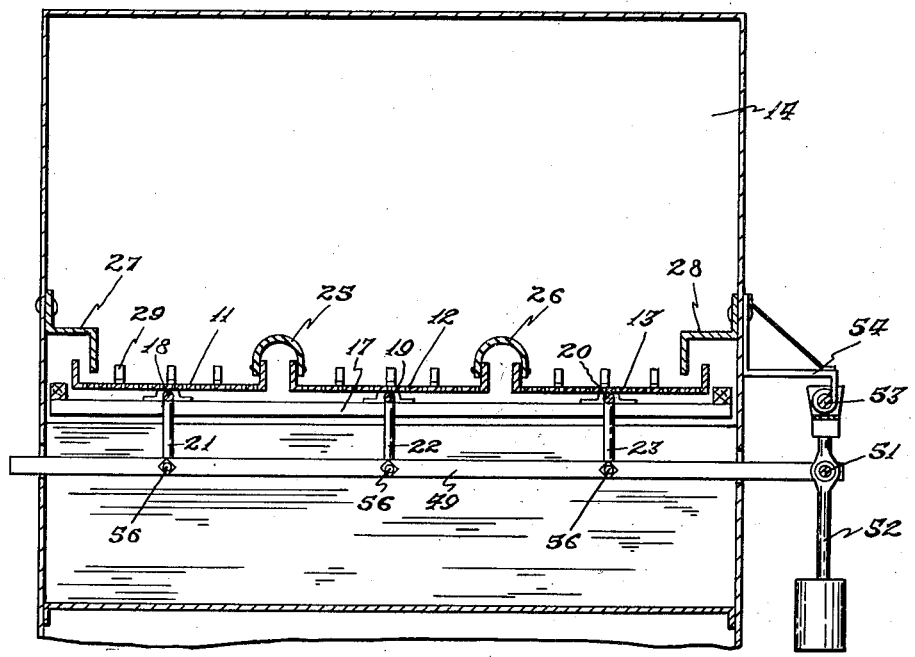
Figure 3 is a view similar to Figure 1, but showing a slightly modified mechanism for leveling the screens.

Referring now to Figures 1 and 2 and Figures 3, 4 and 5, these figures illustrate my improved means for providing screens within a combined harvester in such fashion that the tilting of the harvester when it is going along a slope will not cause the screens to be likewise tilted and thus unevenly loaded with the grain. According to my invention I feed material from a grain pan 10 onto a plurality of screening units 11, 12 and 13, which are arranged within the housing 14 of the harvester. The screen units extend lengthwise of the harvester and are carried on a frame work 15 which has two cross members 16 and 17.

The manner of mounting the screens 11, 12 and 13 on the frame work 15 is to provide pivot rods 18, 19 and 20 on the bottoms of the screen units and to pivotally mount these rods upon the cross bars 16 and 17. The rods 18, 19 and 20 are centrally disposed with respect to the screen units. The rods have depending arms 21, 22 and 23 that are linked together by a cross bar 24 at some distance below the pivot points of the rods. The several screen units have their side edges connected by flexible strips 25 and 26. These strips are preferably wide enough to extend between the adjacent sides of two of the screen units without stretching them when the maximum tilting of the screen takes place. I also provide suitable guards 27 and 28 on the side walls of the housing 14 to overlap within the side walls of the outer screen units to prevent grain from escaping at this point. The several screen units are provided with straw fingers 29.

Any suitable means for vibrating the framework that carries the screen units lengthwise of the harvester housing may be employed, since this part of the mechanism forms no part of my invention. I have illustrated a vibrating means in Figure 5 which comprises an extension 30 from the frame work 15. This extension is connected by a rod 31 to an eccentric 32 that may be operated from any suitable source of power to shake the framework. It is obvious, of course, that various well known devices may be used for imparting the necessary reciprocatory movement to the screen units.

Referring now in particular to Figures 1 and 2 and the detailed Figures 6 to 9 inclusive, I will describe the preferred means for maintaining the screen units in a level position. A bracket 33 is provided on the side of the housing, and this bracket carries a pendulum supporting arm 34. The arm has a pivot 35 for a pendulum 36, and the pivot 35 is in alignment with the plane of the rods 18, 19 and 20. The pendulum has a forked connector 37 pivoted thereto by a pivot pin 38. The connector is adjustably connected to a link 39. The adjustable connection is provided by screw threads on a reduced portion 40 of the link and a threaded socket 41 in the connector 37. A lock nut 42 is provided to hold the adjustment.

The link 39 has a ball 43 on the end thereof within the housing 14. The bracket 33 has a bearing member 44 for the link 39, which allows the link to move endwise and to move up and down a limited amount, but it holds the link against lateral movement. The ball 43 is mounted in a socket 45 which is provided on the lower end of a lever arm 46. The lever arm extends upwardly and is flattened at its upper end and pivoted to a link 47. The other end of the link 47 is pivoted to the flattened end 48 of the rod 20. The link 47 as shown is an inverted U-shaped bar, so that any rocking movement of the lever arm 46 will be communicated to the rod 20 to turn this rod in its pivotal mounting. Endwise movement of the rod 20 will rock the lever arm 46 on the ball 43. Thus the vibration of the screens simply results in a vibratory rocking motion of the lever arm 46 on the ball 43 and does not interfere with the action of the pendulum 36.

Figure 4:
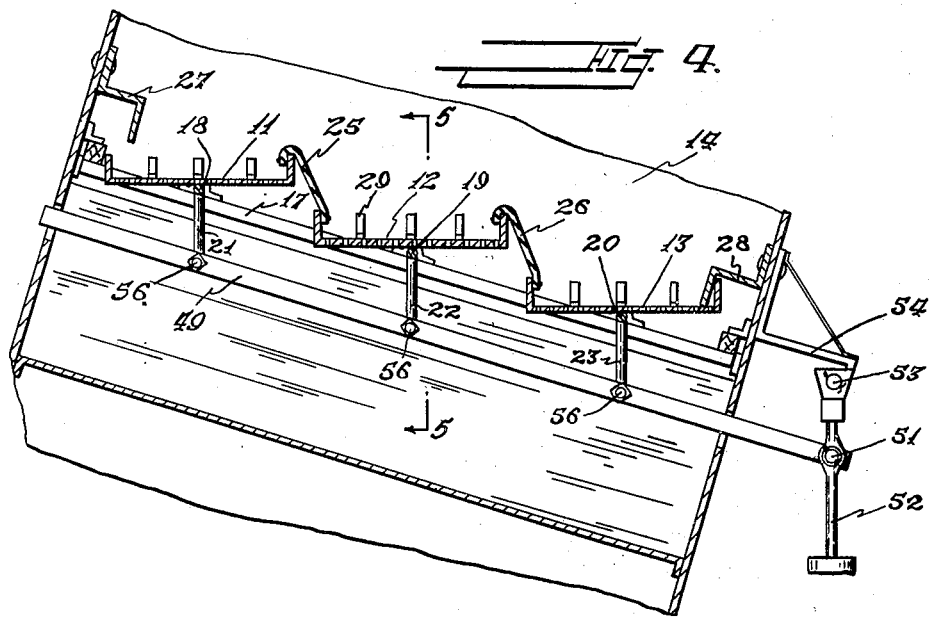
Figure 4 is a view like Figure 3 showing the harvester housing tilted.

Referring now to Figures 3 and 4, the construction in this form of the invention is in general the same as in the preferred form. The mounting of the screens on the frame work 15 is the same, but in this form of the invention two cross bars 49 and 50 are used to connect the several arms 21, 22 and 23 to each other, and these cross bars 49 and 50 are extended outwardly through the housing 14 to connect by means of a pivot pin 51 to the pendulum 52. The pendulum 52 is pivoted by a pin 53 to a bracket 54 on the side of the housing. In order to allow for the vibratory motion of the screens the cross bars 49 and 50 have springs 54 and 55 interposed between them and the lower ends of the arms such as 21, 22 and 23. The springs 54 and 55 are alternately compressed and expanded by the endwise movement of the arms 21, 22 and 23 on the connecting pins 56 that connect the bars 49 and 50 together.

It is believed that the nature and advantages of my invention will be clear from the foregoing description.

Having thus described my invention, I claim:

1. Construction for combined harvesters whereby the passage of the seeds and waste material is over a series of laterally adjacent screens which rise and fall relative to each other as the harvester changes its angle to the horizontal, but which remain level from side to side, a housing, a plurality of screens arranged side by side in said housing, means pivotally mounting said screens for rocking movement about longitudinal axes midway between the sides thereof said longitudinal axes lying in the same plane, arms rigid with said screens and depending therefrom, link means cooperating with said arms below the screens whereby rocking movement of one screen about its axis is communicated to the other screens a pendulum mounted on said housing on an axis in the same plane as the aforesaid longitudinal axes to swing transversely of said axes, and link means interconnecting the pendulum and one of said screens, operable to maintain the screen at right angles to the pendulum.

2. In a construction for combined harvesters whereby the passage of the seeds and waste material is over a series of laterally adjacent screens which rise and fall relative to each other as the harvester changes its angle to the horizontal, but which remain level from side to side, a housing, a plurality of screens arranged side by side in said housing, means pivotally mounting said screens for rocking movement about longitudinal axes midway between the sides thereof said longitudinal axes lying in the same plane, flexible strips of greater width than the distance between screens connecting the adjacent edges of the screens, arms rigid with said screens and depending therefrom, link means cooperating with said arms below the screens whereby rocking movement of one screen about its axis is communicated to the other screens, a pendulum mounted on said housing on an axis in the same plane as the aforesaid longitudinal axes to swing transversely of said axes, and link means interconnecting the pendulum and one of said screens, operable to maintain the screen at right angles to the pendulum.

3. A screening unit and leveling device for use in harvesting machines comprising a framework, means mounting said framework for reciprocatory shaking movement, a plurality of separate screen units arranged side by side on the framework and pivotally supported midway between their sides upon said framework on axes extending in the direction of movement of the framework, the axes of said screen units being parallel and lying in a common plane means interconnecting the screen units operable to turn all of the screens the same amount on their axes when one screen is turned on its axis, a pendulum mounted on an axis in the same plane as the pivotal axes of said screen units to swing in the same direction as said screens, and link means connecting the pendulum and one of said screens for turning the screen in its pivotal mounting.

4. A screening unit and leveling device for use in harvesting machines comprising a framework, means mounting said framework for reciprocatory shaking movement, a plurality of separate screen units arranged side by side on the framework and pivotally supported midway between their sides upon said framework on axes extending in the direction of movement of the framework, the axes of said screen units being parallel and lying in a common plane means interconnecting the screen units operable to turn all of the screens the same amount on their axes, when one screen is turned on its axis, a pendulum mounted on an axis in the same plane as the pivotal axes of said screen units to swing in the same direction as said screens, and link means connecting the pendulum and one of said screens for turning the screen in its pivotal mounting, said link means comprising a rod extended from the screen on its pivotal axis, an arm connected to said rod for turning it, said arm being movable in a plane axially of the rod, and a link connecting the arm with the pendulum.

5. A screening unit and leveling device for use in harvesting machines comprising a framework, means mounting said framework for reciprocatory shaking movement, a plurality of separate screen units arranged side by side on the framework and pivotally supported midway between their sides upon said framework on axes extending in the direction of movement of the framework, the axes of said screen units being parallel and lying in a common plane means interconnecting the screen units operable to turn all of the screens the same amount on their axes when one screen is turned on its axis, means interconnecting the side edges of adjacent screen units to keep grain from falling between the units, a pendulum mounted to swing in the same direction as said screens, and link means connecting the pendulum and one of said screens for turning the screen in its pivotal mounting.

6. A screening unit and leveling device for use in harvesting machines comprising a framework, means mounting said framework for reciprocatory shaking movement, a plurality of separate screen units arranged side by side on the framework and pivotally supported midway between their sides upon said framework on axes extending in the direction of movement of the framework, the axes of said screen units being parallel and lying in a common plane means interconnecting the screen units operable to turn all of the screens the same amount on their axes when one screen is turned on its axis, a pendulum mounted on an axis in the same plane as the pivotal axes of said screen units to swing in the same direction as said screens, and link means connecting the pendulum and one of said screens for turning the screen in its pivotal mounting, said link means comprising a rod extended from the screen on its pivotal axis, an arm connected to said rod for turning it, said arm being movable in a plane axially of the rod, and a link connected to the arm by an universal joint, the other end of the link being connected to the pendulum.

EDWARD W. BOZARTH.

REFERENCES CITED

The following references are of record in the file of this patent:

UNITED STATES PATENTS

| Number | Name | Date |
|---|---|---|
| 455,997 | Closz | July 14, 1891 |
| 509,082 | Heald | Nov. 21, 1893 |
| 645,228 | Lasswell | Mar. 13, 1900 |
| 1,070,552 | Steffy | Aug. 19, 1913 |
| 2,189,706 | Clipston | Feb. 6, 1940 |